(12) United States Patent
Diederen et al.

(10) Patent No.: US 6,318,125 B1
(45) Date of Patent: Nov. 20, 2001

(54) METHOD AND DEVICE FOR BENDING GLASS SHEETS

(75) Inventors: Werner Diederen, Herzogenrath (DE); Karl-Josef Ollfisch, Kerkrade (NL); Klaus-Peter Heining; Knut Dahlhoff, both of Aachen (DE); Wilfried Korsten, Heinsberg (DE); Herbert Radermacher, Raeren (BE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/581,204

(22) PCT Filed: Oct. 20, 1999

(86) PCT No.: PCT/FR99/02549

§ 371 Date: Nov. 27, 2000

§ 102(e) Date: Nov. 27, 2000

(87) PCT Pub. No.: WO00/23388

PCT Pub. Date: Apr. 27, 2000

(30) Foreign Application Priority Data

Oct. 21, 1998 (DE) .............................................. 198 48 373

(51) Int. Cl.$^7$ ................................................. C03B 23/035
(52) U.S. Cl. .............................. 65/102; 65/25.1; 65/25.4; 65/286; 65/287
(58) Field of Search .................................. 65/25.1, 25.4, 65/102, 286, 287, 362

(56) References Cited

U.S. PATENT DOCUMENTS 5,383,947 * 1/1995 Montonen ............................ 65/25.4

FOREIGN PATENT DOCUMENTS 0 706 978      4/1996  (EP) .
89/10330 * 11/1989  (WO) .................................. 65/287

* cited by examiner

Primary Examiner—Michael Colaianni
(74) Attorney, Agent, or Firm—Oblon, Spivak, McClelland, Maier & Neustadt, P.C.

(57) ABSTRACT

A process for shaping glass sheets with a surface-shaping mould, against which the glass sheets are pressed using a pressure drop produced by sucking out the air from the space lying between the moulding face and that face of the glass sheet on the opposite side from the glass sheet, in which the pressure drop is a maximum at the edge of the glass sheet and decreases towards the center of the glass sheet, because of fact that air is introduced via air-inlet apertures opening into the moulding face, the air is again extracted by subjecting suction apertures made in the moulding face inside the region covered by the respective glass sheet to a vacuum. Furthermore, pressure between the glass sheet and the moulding face also in the region where the air is introduced is set to a value at most equal to the pressure beyond the glass sheet, in order to avoid any formation of bulging. A shaping mould suitable in particular for implementing this process is also described.

21 Claims, 2 Drawing Sheets

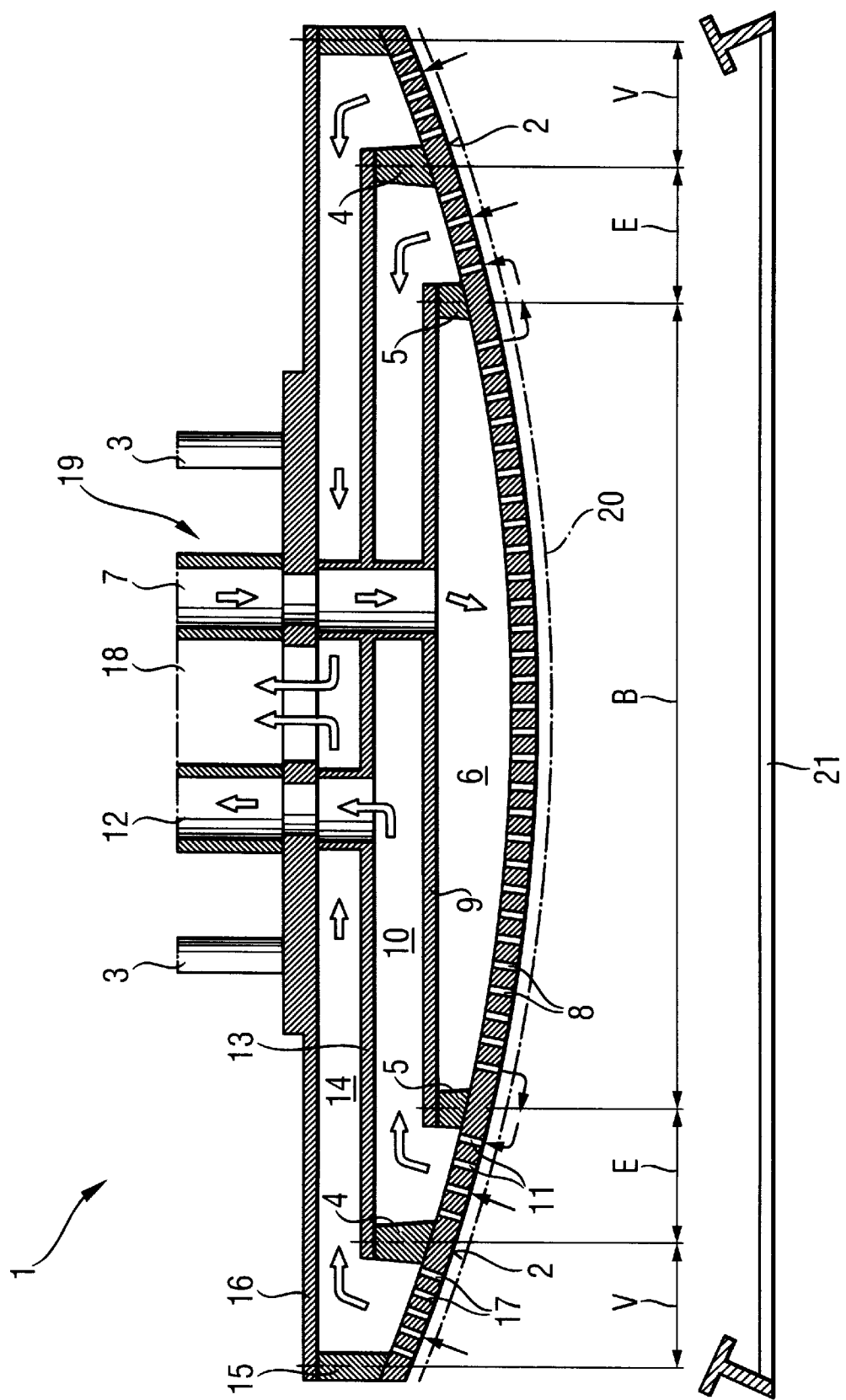

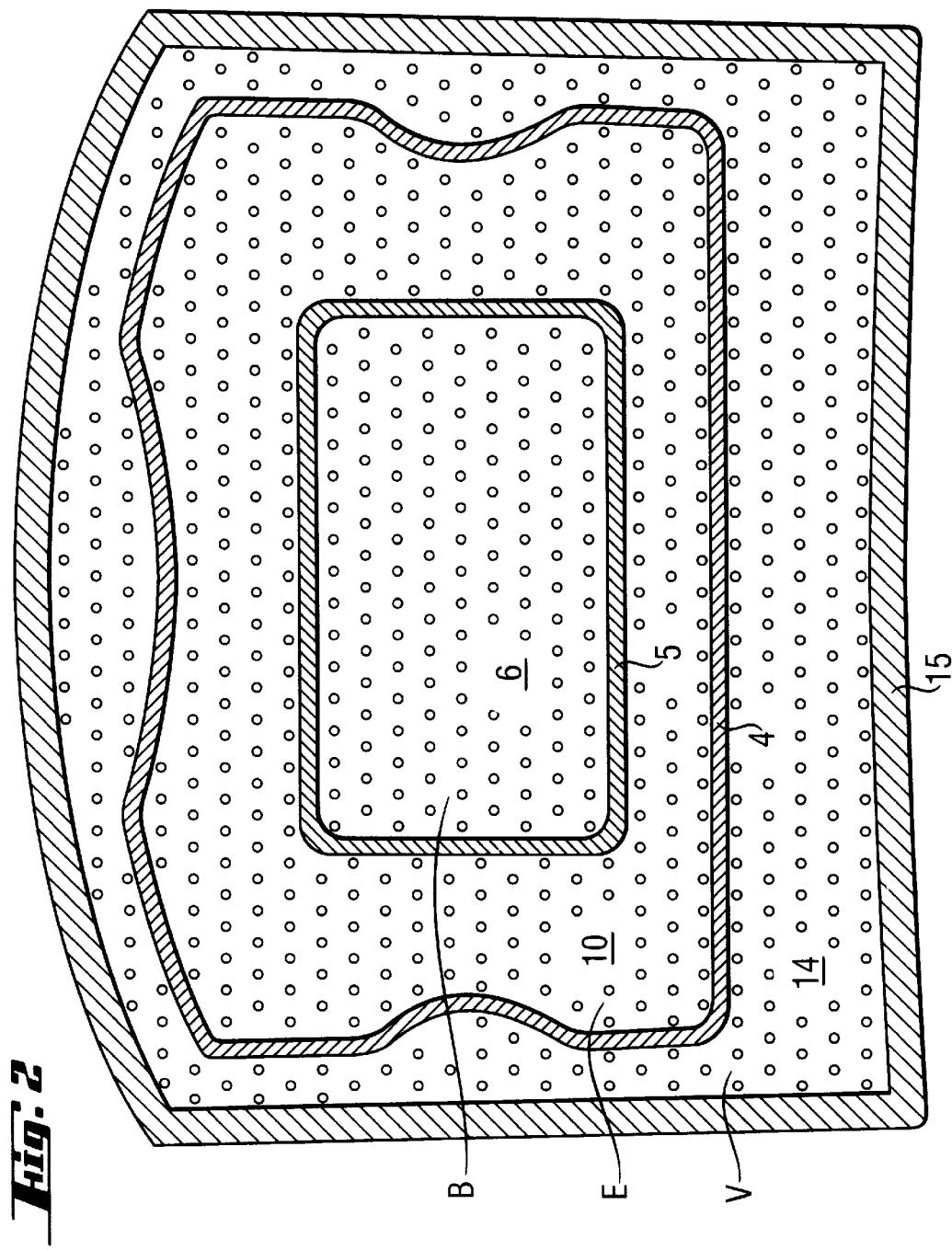

METHOD AND DEVICE FOR BENDING GLASS SHEETS

BACKGROUND OF THE INVENTION

Field of the Invention

The invention relates to a process for bending glass sheets with a surface-shaping mould, against which the glass sheets are pressed using a pressure drop produced by sucking out the air from the space lying between the moulding face and that face of the glass sheet on the opposite side from the latter, the pressure drop being a maximum at the edge of the glass sheet and decreasing towards the middle of the latter, because of the fact that air is introduced into the region of the moulding face via air-inlet apertures, as well as to a device suitable in particular for implementing such a process.

DISCUSSION OF THE BACKGROUND

Document EP 0 241 355 B1 discloses a relevant device in which a skirt surrounds the outer edge of the shaping mould with a peripheral annular slot. Through this annular slot it is possible to suck out the air lying in the space between the glass sheet and the face of the shaping mould. The resulting difference in pressure with respect to the atmosphere acting on the free face of the glass sheet presses the latter against the moulding face. Next, a pressing ring is applied against the free face of the glass sheet, the said pressing ring giving the edge of the sheet the desired final outline.

Direct contacts between metal moulding faces and surfaces of glass sheets pressed against the latter are prevented, in a known manner, by means of interlayers of heat-resistant fabric (see EP-A1-0,767,146). However, in the presence of high application pressures and/or large air pressure differences, it is not possible to completely avoid visible traces of the fabric in the surface of the glass sheet (which is malleable at the shaping temperature).

In an alternative form of the known device, hot air under pressure is therefore blown in between the moulding face and the surface of the glass sheet via channels uniformly distributed over the face of the shaping mould. Thus an air cushion is supposed to be formed, on which the glass sheet floats. It is also possible, with this mould, to shape glass sheets whose central zone is enamelled, or alternatively provided with screen printing, and/or to obtain particularly good optical quality without traces of fabric.

U.S. Pat. No. 5,669,952 discloses a process and a device for sagging glass sheets particularly deeply, in which an upper shaping mould with an entirely convex surface interacts with a lower shaping ring. The glass sheet, deposited on the ring and already preformed by gravity, is subjected to a cushion of pressurized air via outlet channels in the central region of the moulding face, after having been brought close to the upper shaping mould. This cushion of air is used here as a deep-drawing punch, as it is supposed to deepen the shaping of the glass sheet even further without surface contact with the moulding face. In an alternative embodiment, the upper shaping mould has several compartmentalized chambers. It is thus possible to create various pressure levels over the outline of the moulding face. In another alternative embodiment, exhaust apertures are provided in the peripheral region of the face of the shaping mould. They emerge in free pressure chambers (in communication with the atmosphere) inside the upper shaping mould. In this way, the blown-in air can again escape.

Shaping moulds having several vacuum chambers are also known (U.S. Pat. No. 4,877,437). Generically, these create a vacuum over the entire face of the glass sheet applied against the shaping mould. The pressure may again be lowered locally for particularly short radii of the face of the shaping mould, so as here again to ensure good application of the face of the glass sheet against the moulding face and to exclude any bulging. With these known shaping moulds acting purely under vacuum, it is also not possible to remove the impressions of the fabric when several different pressure levels are provided. Even with a mould which has suction apertures only in the edge region, pressure contact of the glass sheet with the moulding face cannot be avoided in the intermediate region. In fact, the shorter the distance between the glass sheet and the mould, the more rapidly the air still present flows and the greater the pressure difference in the region in question with respect to atmosphere.

Finally, document EP 0,182,638 B1 discloses a plane transport plate for glass sheets, the working face of which includes both suction apertures, for lifting and supporting the weight of the glass sheets by vacuum, and air-inlet apertures for producing an air cushion serving as a spacing element between the glass sheets and the working face. This arrangement, in which the suction and air-inlet apertures are uniformly mixed over the entire face, is also supposed to prevent degradation of the sensitive surfaces of the glass sheets by avoiding any mechanical contact.

SUMMARY OF THE INVENTION

The object of the invention is to further optimize a process for shaping glass sheets, in which a pressure level is produces, which varies from the edge towards the centre, between the moulding face and the glass sheet for the purpose of avoiding any trace of the pressing operation, as well as to provide a device which is suitable in particular for implementing this process.

According to the invention, this objective is achieved by the characteristics of Claim 1 with regard to the process. The characteristics of Claim 6 indicate a corresponding device. The characteristics of the secondary claims respectively associated with the independent claims indicate advantageous variants of the said subject-matter.

Preferably, hot air is delivered, specifically in so far as there prevails, in the region in question, as low a pressure as possible with respect to the pressure level acting beyond the glass sheet—and therefore with respect to atmospheric pressure or to a holding pressure for example. In order to avoid impressions of the fabric, it is absolutely not sufficient to bring the air-inlet chambers, or parts of the moulding face, into communication only with the atmosphere, as is known in another respect from the prior art examined. In order to reduce the vacuum, a certain positive introduction of air at a limited, or in other words adjustable, pressure is necessary. Moreover, contact of the glass sheet heated to the shaping temperature with insufficiently heated atmospheric air could have a negative impact on the result of the shaping because of undesirable cooling.

By limiting the injected pressure between the face of the glass sheet and the moulding face and by sucking out the hot air introduced which is still within that region of the moulding face which is covered by the glass sheet, any bulging is avoided, which cannot be completely excluded in the prior art. Of course, controlling the pressure ratios requires a great deal of care. As a result of the controlled delivery of air provided according to the invention, preferably towards the centre of the glass sheet, the contact forces between the glass and the mould, or the fabric, in the central region are minimized in a reproducible manner.

Particularly preferably, the air introduction zone is located in the central region of the moulding face and of the corresponding glass sheet, and the air introduced is again evacuated around this region. It has proved particularly effective in this regard to subdivide, into three zones, the level of pressure existing here in the space between the moulding face and the glass sheet. The outermost of these zones, which extends along the edge of the shaping mould, is, as previously, subjected to a high vacuum, so as to fasten the glass sheet to the moulding face. The intermediate zone is subjected to a lesser reduced pressure, so as, on the one hand, also to contribute to some extent to the retention of the glass sheet and, on the other hand, and mainly however, to extract again along a short path the air introduced into the inner or central zone.

If the moulding face itself of the shaping mould includes, in addition to the air-inlet apertures, suction apertures so as to produce the adjustable pressure drop, the skirt of the relevant prior art can disappear and the shaping mould can therefore be produced in a substantially more compact way than previously. At the same time, it is thus ensured that, after placing the lower annular shaping mould on the edge of the glass sheet, no air cushion is blocked between the moulding face and the glass sheet. Any bulging of the glass sheet with respect to the shaping mould, specifically envisaged in the subject-matter of U.S. Pat. No. 5,669,952, is completely avoided here.

It should be pointed out that the use of the process described here does not depend on the spatial arrangement of the surface-shaping mould inside the shaping device, even if the invention is explained here with reference to an upper-shaping mould. It is always applicable where it is necessary to avoid impressions of the fabric of a surface-shaping mould on the glass sheets.

In a preferred embodiment of the shaping mould, the air-inlet apertures emerge in the intermediate or central region of the face of the shaping mould, while the suction apertures are located along the outer edge of the face of the shaping mould. Admittedly, as previously, it is necessary to take into account the fact that impressions of the fabric appear at the edge of the surface of the glass sheet because of the inevitable contact at this point, at the latest during pressing with the shaping ring. The intermediate region of the surface of the glass sheet may, however, be kept entirely free of traces. This is particularly important in the case of the use of glass sheets in vehicles, where optical defects have to be minimized in the central, main viewing, region of the glass sheets, while very strict requirements are imposed on the dimensional precision in the edge region.

In one particularly advantageous variant, the face of the shaping mould is subdivided into at least three zones, mainly a central zone with air-inlet apertures, the outer edge zone with suction apertures for a relatively high vacuum, and an annular-type zone extending between them, with suction apertures for a reduced vacuum. In this case, the necessary retention force for the glass sheet is firstly provided by the high-vacuum outer zone, while the medium-vacuum zone serves mainly for extraction, along a short path, of the air introduced into the central region.

Of course, for each type of glass sheet to be shaped, the use of this shaping mould requires there to be extremely precise agreement of the parameters of the process and of the device, such as:

the area ratios between the vacuum and air-inlet zones;
the dimensions and distribution of the channels for the vacuum and the overpressure;
the required pressure levels and possibly their variation over time;
the temperature of the shaping mould and of the air to be blown in.

It is not possible to give valid generic setting values of these parameters for all types of glass sheet. However, they may be determined individually by trials at a moderate cost.

It is possible, for each glass sheet model, to determine beforehand an optimum division of the face of the shaping mould into respective zones, by suitable finite-element simulation. When the still-flat glass sheet heated to the shaping temperature comes for the first time into contact with the shaping mould, for example by lifting using a blown-in stream of hot air, it is not possible also to avoid initial contact between the glass sheet and the mould in the central zone. The forces developed are in any case too low—in comparison with the forces due to the pressure difference acting upon application of a vacuum—to create undesirable impressions of the fabric. Next, in the simulation, as in reality, the glass sheet is applied near its essentially flat edge against the spherical moulding face, bulges forming, however, at defined points, in which the glass sheet is not applied against the mould. These bulges are reproducible with sufficient precision with each glass sheet of the same model type. They have to be applied against the moulding face by a greater pressure difference. Consequently, the division of the moulding face into vacuum zones has to be defined according to this simulation with a precision such that, with the actual mould, the glass sheet is applied uniformly over the entire face. This means that no bulging must appear upon contact of the glass sheets with the shaping mould, either in the central region of the sheets or in their edge zones.

As a result, using the process explained above, glass sheets are manufactured in which the main viewing region has practically no impression of the fabric, which sheets are, however, absolutely equivalent to the glass sheets produced with conventional vacuum-shaping moulds when the optical distortion produced by the usual processes is measured.

DESCRIPTION OF THE DRAWINGS

Further details and advantages of the process and of the device that can be used for implementing it will emerge from the illustration of an exemplary embodiment and from its detailed description given below.

In the drawings constituting a simplified representation:

FIG. 1 shows a schematic sectional view of a shaping mould for glass sheets, which is equipped with vacuum and overpressure chambers and with corresponding channels emerging in the moulding face;

FIG. 2 is a view of the moulding face intended to illustrate the division of the latter, specific to the model, into several zones provided with suction and air-inlet apertures.

DESCRIPTION OF THE PREFERRED EMBODIMENTS

FIG. 1 shows a schematic cross section through a shaping mould 1 with a moulding face 2 having a spherical curvature. The shaping mould 1, substantially in the form of a box, is fastened by supports 3 to a conventional-type shaping station, which is not shown. In a manner known per se, the internal space of the shaping mould is subdivided into several chambers by ribs 4, 5.

The peripheral rib 5 circumscribes a continuous intermediate or central region B of the moulding face 2. It thus defines, inside the shaping mould 1, the contour of an air-inlet chamber 6. The latter may be supplied from the outside, via an air-inlet channel 7, with air which can then escape into the atmosphere via a multitude of air-inlet apertures 8 which go from the air-inlet chamber 6 into the region B of the moulding face 2.

The rib 5 and a cover 9, which is joined to the rib and in which the air-inlet channel 7 emerges, separate the air-inlet chamber 6 in the internal space of the shaping mould 1 so as to be pressure-tight with respect to an air exhaust chamber 10 which, projecting from the moulding face 2, surrounds the air-inlet chamber 6 in the manner of a ring. Its outer perimeter is surrounded by the peripheral rib 4. The ribs 4 and 5, placed beside each other at a possibly variable distance, define, projecting from the moulding face 2, an annular air exhaust region E. A multitude of suction apertures 11, which emerge in this region E, connect the air exhaust chamber 10 to atmosphere. The air entering via the suction apertures 11 may be sucked out of the air exhaust chamber 10 via an air exhaust channel 12.

By means of the rib 4 and a cover 13 to which it is joined, in which cover the air exhaust channel 12 emerges, the air exhaust chamber 10 in the internal space of the shaping mould 1 is again separated in a pressure-type manner with respect to a vacuum chamber 14. The latter is in turn closed off towards the outside by a perimetral edge rib 15 and by an outer cover 16 of the shaping mould 1. The rib 4 and the edge rib 15 between them define again an annular outer zone which, projecting from the moulding face 2, forms an outer region V. Also distributed over the latter are again a plurality of suction apertures 17 which connect the vacuum chamber 14 to atmosphere. The air entering the vacuum chamber 14 via the suction aperture 17 can be sucked out via a vacuum channel 18.

The air inlet channel 7 passes through the plane of the cover 13 and of the outer cover 16. The air exhaust channel 12 passes only through the plane of the outer cover 16. The respective penetrations are, of course, pressure-tight. The three channels 7, 12 and 18 are combined into a parallel arrangement in a common connection tower 19, which projects from the outer cover 16. In order for the shaping mould 1 to be able, as required, to be rapidly exchanged for another mould, the three channels 7, 12 and 18 are preferably provided with a common connection interface at the free end of the connection tower 19. Structural modifications of the shaping mould 1 can result in another configuration and another way of guiding the channels.

Inside the shaping station, the channels 12 and 18 are connected to vacuum generators and the channel 7 is connected to a pressure generator. It is necessary to establish, via the vacuum channel 18, a large pressure difference in a very short time, in a manner known per se, in order to cause contact, which as a general rule does not yet exist, between the edge of the glass sheet and the moulding face by a powerful stream of air from the outside into the vacuum chamber 14. This is why this channel has the greatest cross section.

The moulding face 2 is, in a manner known per se, coated with a heat-resistant fabric, not shown here. The latter is permeable to air with a low flow resistance. A glass sheet 20 applied against the moulding face 2 is simply indicated here by a dot-dash line. Finally, also schematically indicated is a lower shaping mould 21 in the form of a shaping ring. The purpose of the latter is, in a known manner, to press the outer edge of the glass sheet 20 against the moulding face. It can also, in a known manner, serve as a support for transporting the shaped glass sheets.

The subdivision of the moulding face 2 into regions B, E and V is illustrated, in plan view, by FIG. 2. This figure shows more clearly that the region B—the air inlet region—lies entirely at the centre of the moulding face, all the sides being a certain distance from the outer edge of the latter. It may furthermore be seen that the region E—the air exhaust region—surrounds the region B as a ring and it is separated from the latter by the rib 5. Finally, the region V—the vacuum region—extending between the rib 4 and the perimetral rib 15 surrounds the region E as a ring. It may also be seen that the rib 4 has in all cases a particularly specified outline. This is designed in particular according to the simulated behaviour (warping and bulging) of the model of the glass sheet to be treated with the shaping mould 1. The suction and air-inlet apertures here are distributed uniformly in order to simplify matters, and are all shown with the same size. It goes without saying that, in practice, the size of the apertures and their distribution over the faces of the regions may be varied, as required, thereby departing from this representation.

The subdivision of the moulding face 2 into regions may also be extended to the upper cover 16. Other variants may therefore also be imagined for the guiding of the channels 7 and 12, in which variants—departing from the schematic representation of FIG. 1—are connected directly from the outside, without passing firstly through other chambers, to the chamber 6, or 10, to which it is associated. For example, it would be possible to join the covers 9 and 13 together, that is to say to extend the rib 5 upwards, just like the rib 4, as far as the cover 13, and then to take the channel 12 laterally from the connection tower 19 into this cover or into the outer cover, as far as the air exhaust region 10, the channel 12 also possibly being optionally subdivided into several branches, in order to shorten the flow paths and suck out the air simultaneously from various portions of the air exhaust region E.

With this shaping mould 1, it is possible to make a powerful vacuum act on the sheet of glass, simply indicated in FIG. 1, only along the outer edge in the region V, thus ensuring that the edge of the glass sheet adheres to the moulding face, while at the same time, in the intermediate or central region B, the vacuum obtaining at the edge is at least reduced by the introduction of hot air at a point such that, on the one hand, no impression of the fabric appears in the surface of the glass sheet and that, on the other hand, however, the glass sheet is still always applied against the moulding face, without the formation of bulges.

In the intermediate or air exhaust zone E, a vacuum is applied which is substantially lower, with respect to atmospheric pressure, than the vacuum obtaining at the edge, but which is sufficient to be certain to again suck out all the air introduced into the region B. Thus, an internal circulation of air from the region B to the region E is established, as indicated in FIG. 1, by small arrows placed between an air-inlet aperture 8 and an air-exhaust aperture 11. Of course, the high vacuum applied to the edge can also suck out the air from the central region. Nevertheless, in the space between the glass sheet and the moulding face, there is a relatively rapid (absolute) pressure rise, in the transition zone flowing from the region V to the region E and from the latter to the region B.

What is claimed is:

1. A process for shaping a glass sheet with a surface-shaping mould, comprising the steps of:

creating a pressure drop by applying vacuum to suck out air in a space between a moulding face of the surface-shaping mould and the glass sheet while introducing air from the moulding face through air inlet apertures in the moulding face such that the pressure drop is maximum around an edge portion of the glass sheet and decreases towards a center portion of the glass sheet;

extracting the air by subjecting suction apertures in the moulding face to a vacuum; and setting a pressure in a space between the glass sheet and the moulding face where the air is being introduced to a value at most equal to a pressure beyond the glass sheet.

2. A process according to claim 1, wherein the air is introduced from a central portion of the moulding face and is extracted, via the suction apertures, in an intermediate portion surrounding the central portion at a certain distance from an edge portion of the moulding face.

3. A process according to claim 1, wherein the glass sheet is held against the surface-shaping mould by subjecting outer ones of the suction apertures located in the edge portion of the moulding face to a vacuum.

4. A process according to claim 2, wherein:

the air introduced via the air-inlet apertures is sucked out from the intermediate portion of the moulding face by applying a vacuum to ones of the suction apertures in the intermediate portion and a vacuum to outer ones of the suction apertures in the edge portion; and the vacuum to ones of the suction apertures in the intermediate portion is lower than the vacuum to outer ones of the suction apertures in the edge portion of the moulding face.

5. A process according to claim 1, wherein the glass sheet is pressed against the edge portion of the moulding surface by a lower shaping mould acting on the edge portion of the moulding surface.

6. A device for shaping a glass sheet, comprising:

a surface-shaping mould having a moulding face configured to be pressed against the glass sheet, the moulding face having a first portion and a second portion;

a plurality of air-inlet apertures provided in the second portion of the moulding face, said plurality of air-inlet apertures being configured to introduce air;

a plurality of suction apertures provided in the first portion of the moulding surface, said plurality of suction apertures configured to extract the air by applying vacuum sufficient to create a pressure drop which is maximum around an edge portion of the glass sheet and decreases towards a center portion of the glass sheet and a pressure between the glass sheet and the second portion of the moulding surface to be at most equal to a pressure beyond the glass sheet.

7. A device according to claim 6, wherein the first portion of the moulding face is provided along an outer edge portion of the moulding surface and the second portion is provided in a center portion of the moulding face.

8. A device according to claim 6, wherein the moulding surface has a third portion having a plurality of intermediate suction apertures, the third portion being provided between the first portion and the second portion.

9. A device according to claim 8, wherein the third portion surrounds the second portion in the moulding face.

10. A device according to claim 6, wherein the plurality of air-inlet apertures in the second portion communicated to a first chamber and the plurality of suction apertures in the second portion communicated to a second chamber, the first and second chambers each being communicated with a channel, respectively.

11. A device according to claim 10, wherein the first and second chambers are formed by a plurality of ribs and a plurality of covers on an opposite side of the moulding face.

12. A device according to claim 10, wherein the channels respectively associated with the first and second chambers are collectively disposed in a common connection tower.

13. A device according to claim 6, wherein the first portion with the plurality of suction apertures is provided along an edge portion of the moulding face varying between 40 and 200 mm from an edge of the moulding face.

14. A device according to claim 6, further comprising an annular mould configured to press the edge portion of the glass sheet against the moulding face.

15. A device for shaping a glass sheet, comprising:

a surface-shaping mould having a moulding face configured to be pressed against the glass sheet, the moulding face having a first portion, a second portion and a third portion, the third portion being provided between the first portion and the second portion;

a plurality of air-inlet apertures provided in the second portion of the moulding face, said plurality of air-inlet apertures being configured to introduce air;

a plurality of suction apertures provided in the first portion of the moulding face, said plurality of suction apertures configured to extract the air; and a plurality of intermediate suction apertures in the third portion of the moulding face, said plurality of intermediate suction apertures configured to extract the air.

16. A device according to claim 15, wherein the third portion surrounds the second portion in the moulding face.

17. A device according to claim 15, wherein the plurality of air-inlet apertures in the second portion communicated to a second chamber, the plurality of suction apertures in the first portion communicated to the first chamber, and the plurality of intermediate suction apertures in the third portion communicated to a third chamber, the first, second and third chambers each being communicated with a channel, respectively.

18. A device according to claim 16, wherein the first, second and third chambers are formed by a plurality of ribs and a plurality of covers on an opposite side of the moulding face.

19. A device according to claim 16, wherein the channels respectively associated with the first, second and third chambers are collectively disposed in a common connection tower.

20. A device according to claim 15, wherein the first portion with the plurality of suction apertures is provided along an edge portion of the moulding face varying between 40 and 200 mm from an edge of the moulding face.

21. A device according to claim 15, further comprising an annular mould configured to press the edge portion of the glass sheet against the moulding face.

\* \* \* \* \*